(12) United States Patent
Corr

(10) Patent No.: US 6,385,361 B1
(45) Date of Patent: May 7, 2002

(54) OPTICAL/ELECTRICAL INPUTS FOR AN INTEGRATED CIRCUIT

(75) Inventor: William Eric Corr, Middlesex (GB)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/382,945

(22) Filed: Aug. 25, 1999

(51) Int. Cl.[7] .................................................. G02B 6/12
(52) U.S. Cl. ............................. 385/14; 385/39; 385/49
(58) Field of Search .............................. 385/14, 39, 49, 385/88, 89

(56) References Cited

U.S. PATENT DOCUMENTS

| | | |
|---|---|---|
| 5,054,870 A | 10/1991 | Losch et al. |
| 5,119,451 A | 6/1992 | Wills et al |
| 5,199,087 A | 3/1993 | Frazier |
| 5,359,208 A * | 10/1994 | Katsuki et al. ............... 257/82 |
| 5,394,490 A | 2/1995 | Kato et al. |
| 5,535,036 A * | 7/1996 | Grant .......................... 359/163 |
| 5,631,571 A * | 5/1997 | Spaziani et al. ............. 324/752 |

FOREIGN PATENT DOCUMENTS

EP        0 734 068 A2      9/1996

* cited by examiner

*Primary Examiner*—Rodney Bovernick
*Assistant Examiner*—Sung Pak
(74) *Attorney, Agent, or Firm*—Oppenheimer, Wolff & Donnelly

(57) ABSTRACT

An integrated circuit having a die with one or more electrical input cells and one or more optical input cells. The cells are arranged together in an array, and the cells may have generally the same size and equivalent geographies, to permit standard electrical-only tools and practices to be used for designing the die.

18 Claims, 2 Drawing Sheets

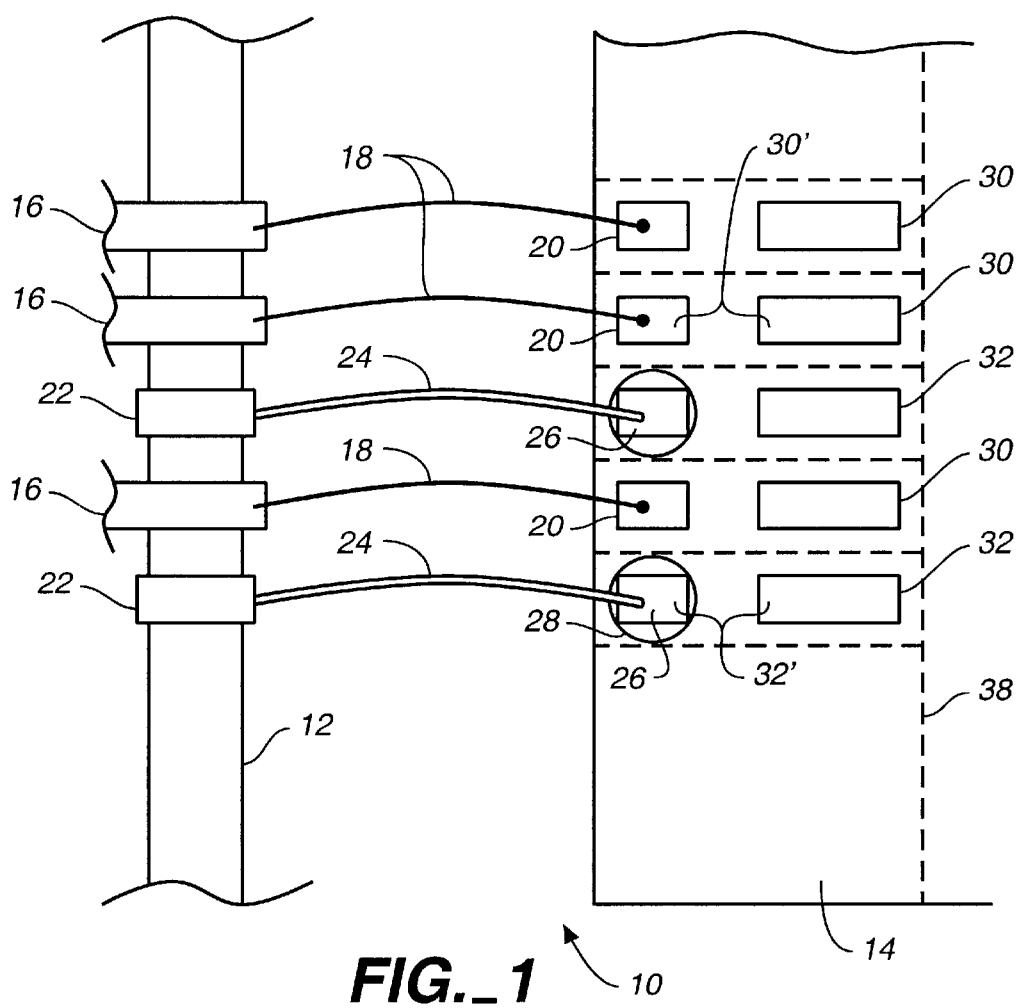
FIG._1
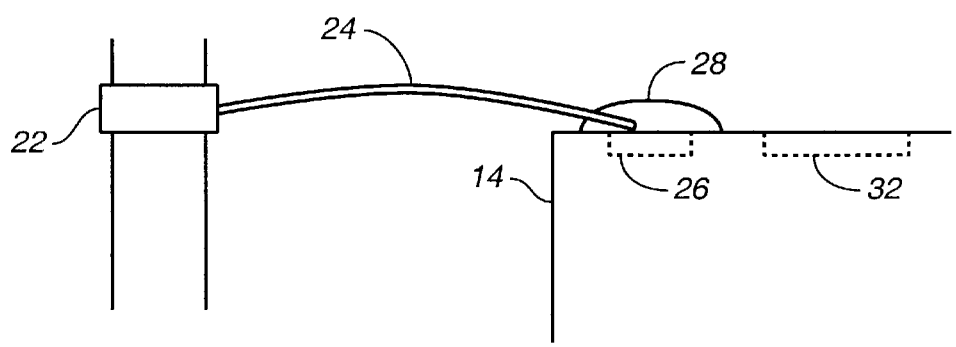
FIG._2

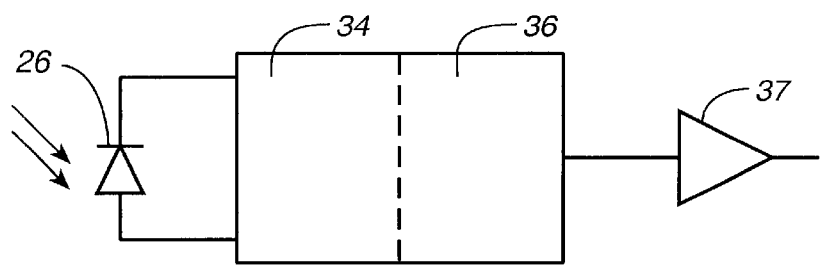
FIG._3
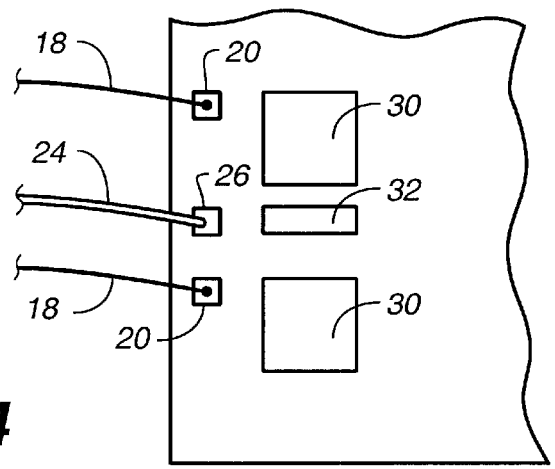
FIG._4
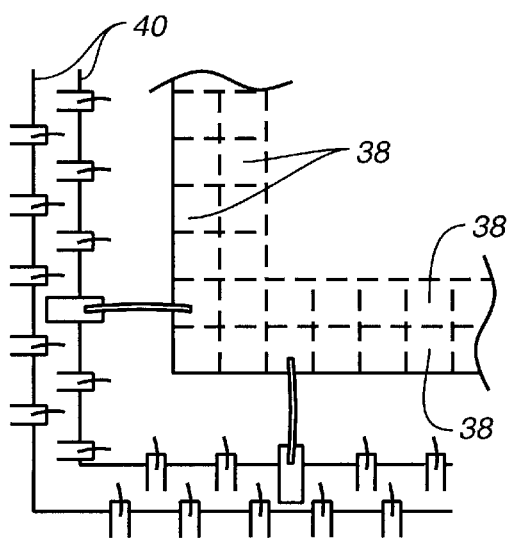
FIG._5

OPTICAL/ELECTRICAL INPUTS FOR AN INTEGRATED CIRCUIT

FIELD AND BACKGROUND OF THE INVENTION

This invention relates to integrated circuits which employ optical inputs to the integrated circuit die as well as one or more electrical inputs or outputs.

SUMMARY OF THE INVENTION

Broadly speaking, the invention provides an interface layout for interfacing electrical and optical input signals to the integrated circuit die, wherein the electrical and optical input cells are arranged in one or more arrays, at least one array including at least one electrical input and at least one optical input.

The term "optical" is used herein broadly, and is not limited only to visible light. The term is intended to cover any radiation which obeys substantially the laws of optics.

The or each array may be linear (e.g. rows and/or columns), or multi-linear or non-linear, or the arrays may includes both linear and non-linear arrays.

One or more of the arrays may be at, or adjacent to, the periphery of the integrated circuit die. Alternatively, or additionally, the die may incorporate a "full area" input/output array in which the array is spread over substantially the entire area of the die (or at least a significant portion of the full area).

By arranging the optical and electrical inputs in the above manner, the integrated circuit designer can follow standard design practice, without having to pay extra consideration as whether the input cell is an optical cell or an electrical input cell.

Preferably, the optical input cell and the electrical input cell have generally equivalent "geographies". For example, the optical input cell may include a photosensitive region which is positioned at an equivalent position to the electrically conductive input pad of the electrical input cell. Additionally, or alternatively, the optical input cell may include an input (processing) circuit which is positioned at an equivalent position to the electrical input circuit of an electrical input cell.

Preferably, an (or at least one) optical input cell occupies approximately the same size of die area as an electrical input cell (or at least one of the electrical input cells if the electrical input cells have a range of different sizes). Typically, the pad size for an electrical contact wire is about 100×100 $\mu$m (although depending on the type of semiconductor substrate and the integration technology, this could be as small as about 50×50 $\mu$m. Preferably, an optical input cell includes a photosensitive region of about the same size as a pad for the electrical input (or for at least one of the electrical inputs).

Preferably, the optical input cell includes conditioning circuitry which occupies approximately the same size area of die as does the input protection/buffer circuitry associated with an electrical input (or at least one of the electrical inputs).

Preferably, the or each optical input enters the integrated circuit package from or through the side of the package.

DESCRIPTION OF THE DRAWINGS

An embodiment of the invention is now described by way of example only, with reference to the accompanying drawings, in which:

FIG. 1 is a schematic plan view of an edge portion of an integrated circuit die;

FIG. 2 is a schematic side view of an optical input device;

FIG. 3 is a schematic view of an alternative arrangement of input and output cells; and FIG. 4 is a schematic view of a further alternative arrangement of input and output devices.

FIG. 5 is a schematic view of an array of input and output devices along two edges of an integrated circuit die.

DESCRIPTION OF PREFERRED EMBODIMENTS

Referring to FIGS. 1 and 2, an integrated circuit 10 comprises a package 12 containing an integrated circuit die 14. The package comprises a number of peripheral contacts, in the forms of terminal pins 16 in the present embodiment. Each pin is coupled by a respective lead wire 18 which is welded to an electrical input pad 20, the pads 20 being arranged adjacent to the peripheral circuit edge of the die 14. Associated with each pad 20 is an input circuit 30 located adjacent to the pad 20. The input circuit 30 contains input protection, for example, against static build-up, and may also contain input buffer circuitry. Together the pad 20 and the input circuit 30 form an electrical input cell 30'.

The integrated circuit 10 also has at least one optical input, provided by an optical input coupler 22 located in the wall of the package 12. For example, the coupler 22 may be an optical fibre coupler. A short length of optical fibre 24 extends from the coupler 22 to a photosensitive area 26 of the die 14. The photosensitive area may be formed by a photo-diode, or a photo-transistor. The fibre is secured to the photosensitive area 26 by means of an adhesive encapsulation 28. Associated with each photo-sensitive area 26, and located adjacent thereto, is an optical input circuit 32, for conditioning the signal output from the photo-sensitive area 26. Referring to FIG. 3, the input circuit typically comprises an input amplifier 34 coupled to the output from the phototransistor or photo-diode 26, a thresholding circuit 36 for discriminating the input signal level, and an output buffer amplifier 37. Together, the photosensitive area 26 and the circuit 32 form an optical input cell 32'.

The electrical input pads 20 and the electrical input circuits 30, and the optical input areas 26 and the optical input circuits 32, are arranged in one or more linear arrays, denoted by broken line 38. In this embodiment, only one array 38 is required to accommodate the number of inputs illustrated.

By arranging the inputs in this manner, the integrated circuit can follow normal design conventions for the placement of input and output circuit cells. This enables the designs to be produced to conventional standards, and allows existing circuit design, analysis, and testing tools to be used with little or no modification.

In the illustrated embodiment, the electrical input cells and the optical input cells have roughly the same size. In an alternative embodiment, it may be desirable to reduce or increase the size of one type of cell (for example, the electrical cell) with respect to one or more of the other type of cell. For example, such an arrangement is illustrated in FIG. 4, in which the electrical input circuit cell 30 is increased in size to provide increase circuit protection against static electricity. As seen in FIG. 4, the circuit cells are arranged in a linear array type form, which enables existing design tools to be used in the design of the circuit.

Referring to FIG. 5, when a large number of input and output circuit cells are required, it may be necessary to provide more than one linear array 38 of cells, and also to stack the electrical contacts on more than one tier, or terminal pin deck 40. In the arrangement shown in FIG. 5, multi-linear arrays are employed. However, the invention nevertheless enables the die to be designed in accordance with existing conventions, so that the optical inputs do not have to be positioned at awkward positions away from the remainder of the electrical inputs to the die.

Although the above embodiments illustrate one or more arrays positioned adjacent to the periphery of the die, it will be appreciated that the same principles can be applied to a full area input/output array which extends over substantially the entire area of the die. Furthermore, although linear arrays may be preferred in some cases (for grid-like circuit designs), the same principles can be applied to a non-linear array of input and/or output circuit cells, which is not limited to a straight-line or grid based layout.

It will be appreciated that the invention, particularly as described in the preferred embodiments, enables electrical input cells and optical input cells to be mixed together in a uniform manner, so that existing design conventions for electrical-only input cells can easily be applied.

It will be appreciated that the above description is merely illustrative of preferred embodiments of the invention, and that modifications may be made within the scope of the invention.

What is claimed is:

1. An integrated circuit die comprising:
    an interface for interfacing electrical and optical input signals;
    the interface comprising an array of input and/or output circuit cells, at least one of the circuit cells further comprising an input amplifier and a thresholding circuit;
    wherein the at least one electrical input cell comprises a conductive input pad and an electrical signal input circuit coupled to the input pad;
    the array comprising at least one optical input cell which occupies substantially the same size of die area as at least one electrical input cell of the array; and
    wherein the at least one optical input cell comprises a photosensitive region and a signal input circuit coupled to the photosensitive region.

2. An integrated circuit device comprising:
    an interface for interfacing electrical and optical input signals;
    the interface comprising an array of input and/or output circuit cells, at least one of the circuit cells further comprising an input amplifier and a thresholding circuit;
    the array comprising at least one electrical input cell comprising an input contact pad and a first circuit coupled to the pad; and
    the array further comprising at least one optical input cell comprising a photosensitive region and a second circuit coupled to the photosensitive region;
    wherein the pad and the photosensitive regions are located at generally equivalent positions in each respective cell, and the first and second circuits are located at generally equivalent positions in each respective cell.

3. An integrated circuit device according to claim 2, further comprising at least one externally contactable electrical input terminal coupled to a respective electrical input cell by an electrical conductor, and at least one externally communicable optical input terminal coupled to a respective optical input cell by an optical conductor.

4. An integrated circuit device according to claim 3, wherein the electrical conductor comprises a wire.

5. An integrated circuit device according to claim 3, wherein the optical conductor comprises an optical fiber.

6. An integrated circuit device according to claim 2, further comprising a phototransistor wherein an input of said input amplifier is connected to an output of the phototransistor.

7. An integrated circuit device according to claim 6, wherein an output of the input amplifier is connected to an input of the thresholding circuit.

8. An integrated circuit device according to claim 2, comprising a plurality of electrical terminals and a plurality of optical terminals.

9. An integrated circuit die comprising:
    an array of circuit cells adapted to interface electrical and optical input signals, at least one of the circuit cells further comprising an input amplifier and a thresholding circuit; and
    the array including at least one optical input cell that has substantially the same die footprint as at least one electrical input cell of the array;
    wherein the at least one electrical input cell includes an input contact pad and a first circuit coupled to the pad, and the at least one optical input cell includes a photosensitive region and a second circuit coupled to the photosensitive region.

10. An integrated circuit die according to claim 9 wherein the pad and the photosensitive region are located at generally equivalent positions in each respective cell, and the first and second circuits are located at generally equivalent positions in each respective cell.

11. A method of designing an integrated circuit die having at least one optical input and at least one electrical input, the method comprising:
    designating an area of the die as an input array comprising a plurality of input cells;
    designating at least one cell of the array as an electrical input cell; and
    designating at least one cell of the array as an optical input cell, said optical input cell comprising an input amplifier and a thresholding circuit;
    wherein the optical input cell and said electrical input cell have substantially the same size of footprint on the die;
    wherein the electrical input cell includes an input contact pad and a first circuit coupled to the pad, and the optical input cell includes a photosensitive region and a second circuit coupled to the photosensitive region.

12. A method according to claim 11, wherein the pad and the photosensitive region are located at generally equivalent positions in each respective cell, and the first and second circuits are located at generally equivalent positions in each respective cell.

13. An integrated circuit die comprising:
    an interface for interfacing electrical and optical input signals;
    the interface comprising an array of input and/or output circuit cells, at least one of the circuit cells further comprising an input amplifier and a thresholding circuit;
    the array comprising at least one optical input cell which occupies substantially the same size of die area as at least one electrical input cell of the array; and
    a photo-transistor wherein an input of said input amplifier is connected to an output of the photo-transistor.

14. An integrated circuit die according to claim 13, wherein an output of the input amplifier is connected to an input of the thresholding circuit.

15. An integrated circuit die comprising:

an array of circuit cells adapted to interface electrical and optical input signals, at least one of the circuit cells further comprising an input amplifier and a thresholding circuit;

the array including at least one optical input cell that has substantially the same die footprint as at least one electrical input cell of the array; and a photo-transistor wherein an input of said input amplifier is connected to an output of the photo-transistor.

16. An integrated circuit die according to claim 15, wherein an output of said input amplifier is connected to an input of the thresholding circuit.

17. A method of designing an integrated circuit die having at least one optical input and at least one electrical input, the method comprising:

designating an area of the die as an input array comprising a plurality of input cells;

designating at least one cell of the array as an electrical input cell; and designating at least one cell of the array as an optical input cell, said optical input cell comprising an input amplifier and a thresholding circuit;

wherein the optical input cell and said electrical input cell have substantially the same size of footprint on the die; and a photo-transistor wherein an input of said input amplifier is connected to an output of the photo-transistor.

18. An integrated circuit die according to claim 17, wherein an output of the input amplifier is connected to an input of the thresholding circuit.

\* \* \* \* \*